United States Patent [19]
Guzman et al.

[11] Patent Number: 5,422,955
[45] Date of Patent: Jun. 6, 1995

[54] WIRELESS AMPLIFICATION SYSTEM FOR MUSICAL INSTRUMENTS

[75] Inventors: Elias Guzman, Yonkers, N.Y.; Bruce Hildesheim, Cambridge, Canada

[73] Assignee: DSA Systems Corp., Cambridge, Canada

[21] Appl. No.: 87,660

[22] Filed: Jul. 6, 1993

[51] Int. Cl.⁶ .............................................. H04B 3/00
[52] U.S. Cl. ........................................ 381/77; 381/118
[58] Field of Search ................. 81/723, 727, 726, 731; 381/77, 79, 14

[56] References Cited

U.S. PATENT DOCUMENTS

| | | |
|---|---|---|
| 3,085,460 | 4/1963 | Edwards . |
| 3,781,451 | 12/1973 | Nolan . |
| 3,869,952 | 3/1975 | Rowe ................................ 84/727 |
| 3,901,118 | 8/1975 | Ford . |
| 3,934,201 | 1/1976 | Majefski ............................ 381/14 |
| 4,099,437 | 7/1978 | Stavrou et al. . |
| 4,186,641 | 2/1980 | Dorfman . |
| 4,344,184 | 8/1982 | Edwards . |
| 4,501,186 | 2/1985 | Ikuma ................................ 84/731 |
| 4,748,886 | 6/1988 | De Byl .............................. 84/723 |
| 5,007,324 | 4/1991 | DeMichele . |
| 5,010,803 | 4/1991 | Donnell ............................ 84/723 |
| 5,025,704 | 6/1991 | Davis . |

OTHER PUBLICATIONS

Article, Samson Technologies advertisement, source unknown, 1991.

*Primary Examiner*—Forester W. Isen
*Attorney, Agent, or Firm*—Schweitzer Cornman & Gross

[57] ABSTRACT

A wireless sound transmission system for musical instruments includes a transmitter which can be mounted within the hollow body of the instrument. The transmitter is provided with a clamp which positions it adjacent the sound hole through which it is inserted. The transmitter may have a face contained to follow the outline of the sound hole. In a first embodiment, the transmitter is adapted to be mounted through and proximate a round sound hole. In a second embodiment, the transmitter is adapted to be mounted through an f sound hole.

16 Claims, 5 Drawing Sheets

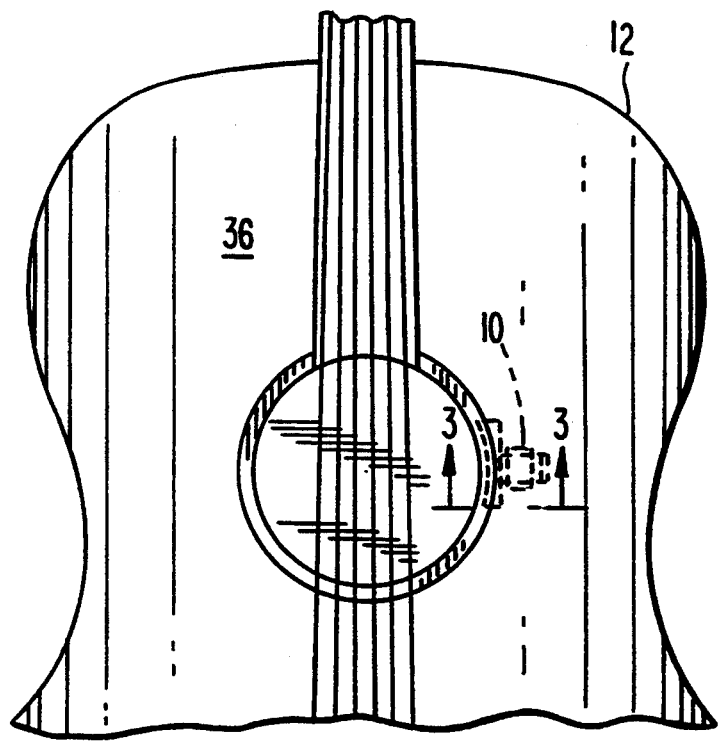
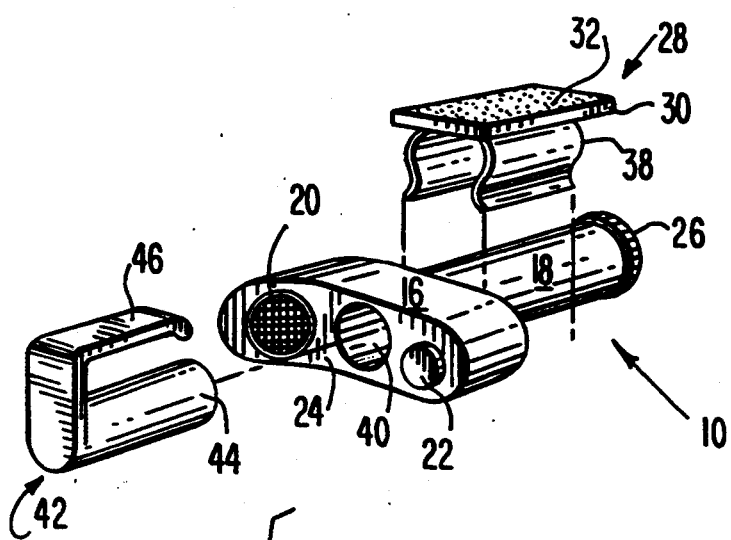
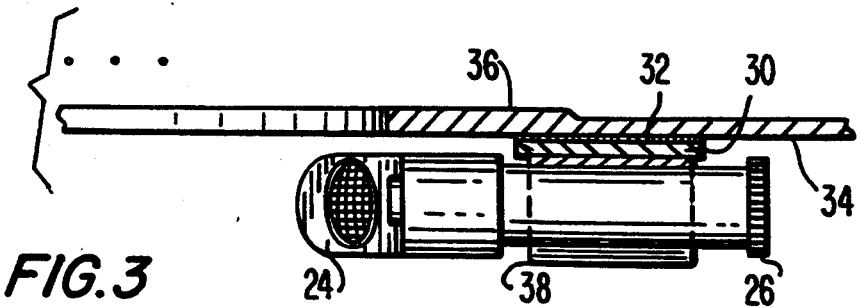
FIG. 1
FIG. 2
FIG. 3

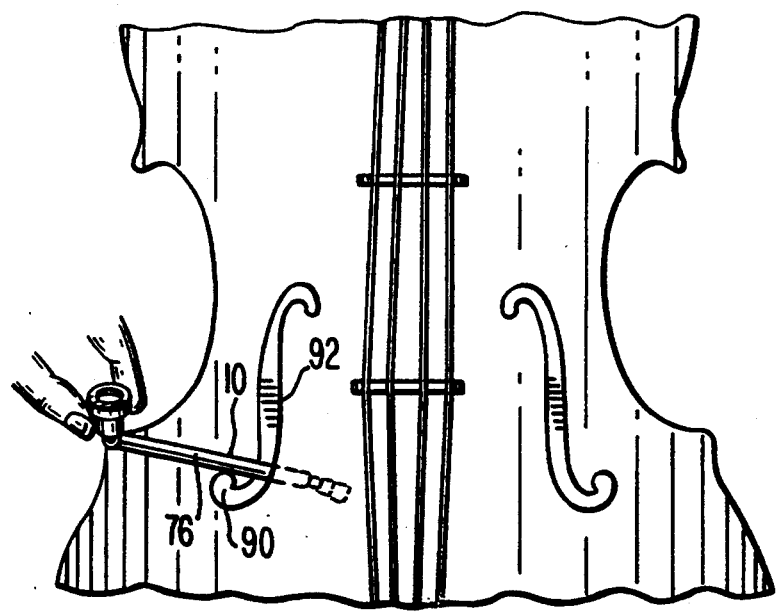
FIG.7
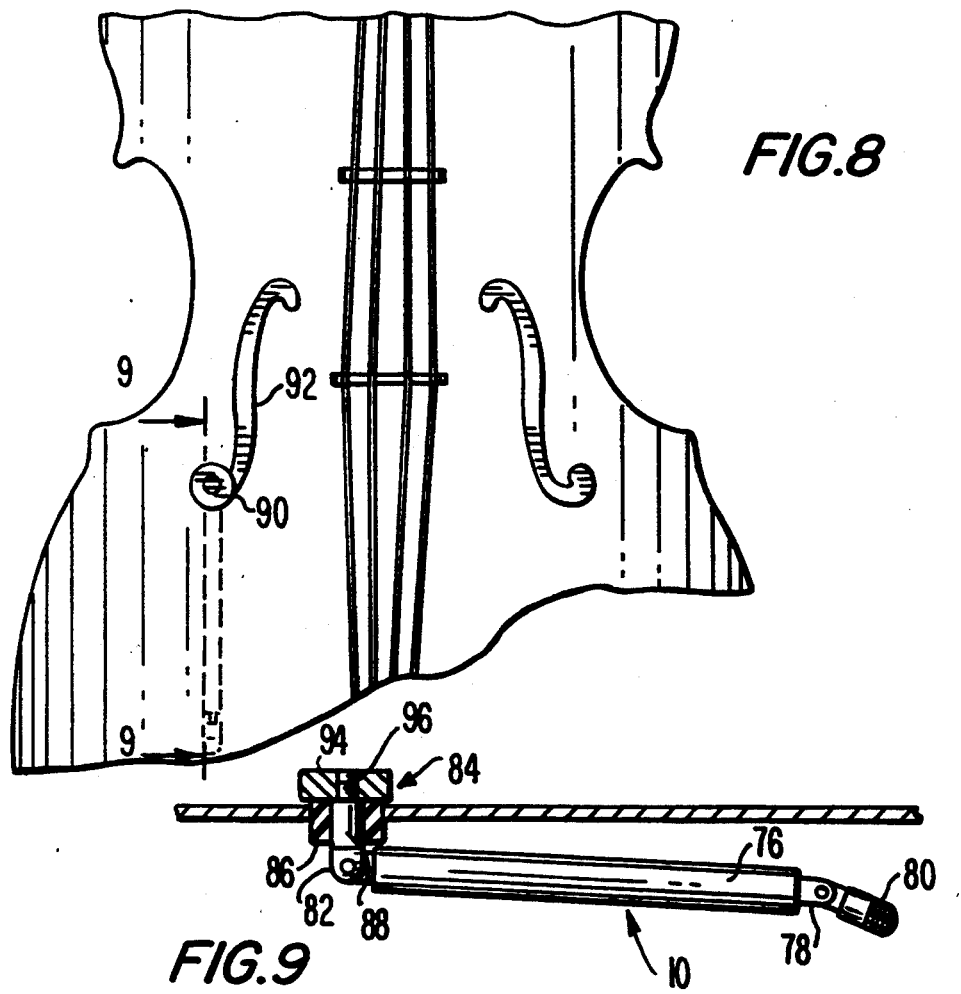
FIG.8
FIG.9

WIRELESS AMPLIFICATION SYSTEM FOR MUSICAL INSTRUMENTS

The present invention relates to the electrical arts and, in particular, to an apparatus for providing amplification to the sounds of certain musical instruments.

BACKGROUND OF THE INVENTION

The use of sound pickups and amplification devices in connection with musical instruments is well known. The so-called "electrical" guitars, for example, are provided with electrical pickup means which convert the sound-generating string vibrations into an electrical signal which, typically by use of a cable from the instrument, is passed to an amplification and reproduction unit. Because the electrical pickups serve as part of the primary sound generating system for the instrument, the guitar is constructed in a manner directed to that end. Its acoustic properties are substantially different from those of a traditional, "non-electric", instrument.

In addition to instruments, such as the electric guitar, which are specifically designed for electronic amplification, a variety of devices have been developed for electrical amplification of the sounds of conventional acoustic instruments. Such devices typically include a microphone-type pickup mounted to the instrument body, either hard wired to a remote amplification device or, preferably, coupled to a wireless transmitter which broadcasts the signal to a receiver at the amplification site. Such a setup presents a more aesthetically pleasing methodology, typically avoiding long cable runs and allowing more flexibility in the positioning of the amplification equipment vis-a-vis the performer.

To insure sufficient coupling between the sound generated by the instrument and the pickup device, the sound pickup unit is preferably mounted directly upon the instrument. While the means by which the pickup is mounted to the instrument and its placement on the instrument may be of little concern to the average player, highly skilled performers, utilizing instruments often valued at many thousands of dollars, are vitally concerned that the pickup be positioned on the instrument so as to most properly and fully receive and transmit the instrument's sounds in a manner faithful to their generation, while not significantly affecting the tonal response of the instrument. In addition, it is of great importance that the device both be non-obtrusive when placed on the instrument and that it does not in any way cause damage to the instrument.

It is accordingly a purpose of the present invention to provide a wireless transmission system for sounds developed by musical instruments.

Yet another purpose of the present invention is to provide a wireless transmission system capable of being mounted upon an instrument in an unobtrusive manner, without significantly modifying the tonal response of the instrument or causing damage or mechanical alteration thereto.

Still another purpose of the present invention is to provide a wireless transmitter for a musical instrument which may be easily installed upon and recovered from the instrument and which will remain in place to provide high fidelity, full tonal pickup with respect thereto.

DESCRIPTION OF THE INVENTION

In accordance with the above and further objects and purposes, the present invention comprises a wireless transmitter adapted for mounting to an instrument, through utilization of the instrument's sound hole or other appropriate part of the instrument's resonating chamber. A remote receiver receives the transmission and converts it into an electrical signal which may be amplified as known in the art.

In a first embodiment, the transmitter is particularly adapted for use with an acoustic guitar, utilizes the instrument's sound hole for mounting purposes and consists of a miniaturized housing in which a microphone, radio-frequency transmitter and power supply are mounted. The housing is adapted to be placed within the resonating chamber body of the guitar, and includes a mounting portion adapted to mate with a clip which is affixed to the inside of the guitar proximate the sound hole. The housing is further provided with gripping means to permit it to be supported by the hand of the installer to allow the transmitter to be manually manipulated about the guitar strings and through the sound hole for affixation to the clip. In a preferred embodiment, the gripping means may comprise a stopped bore extending into the interior of the housing from an exterior end face thereof, the bore being dimensioned to allow the unit to be supported upon a finger of the user.

In an alternative embodiment, the transmitter is mounted in an elongated housing. A frictional mount member is rotatably mounted to one end of the housing, the transmitter microphone being pivotally mounted to the other end of the housing. This embodiment is especially well adapted for frictional engagement with instruments having F-shape sound holes.

BRIEF DESCRIPTION OF THE DRAWINGS

A fuller understanding of the present invention and the various aspects thereof will be accomplished upon review of the following, detailed description of the invention and the accompanying drawings, wherein:

FIG. 1 is a top plan view of a portion of a guitar with the transmitter of the invention mounted thereon;

FIG. 2 is a detailed perspective view of the transmitter of FIG. 1 and alternative mounting means therefor;

FIG. 3 is an elevation view in section taken along line 3—3 of FIG. 1 detailing the transmitter in place utilizing a first mounting means;

FIG. 7 is a plan view of an alternative embodiment of the invention being inserted within an F-hole of an instrument;

FIG. 8 is a plan view showing the transmitter of FIG. 7 in place;

FIG. 9 is an elevation section view in section taken along line 9—9 of FIG. 8 detailing the configuration and orientation of the transmitter;

DETAILED DESCRIPTION OF THE INVENTION

Figure 4:
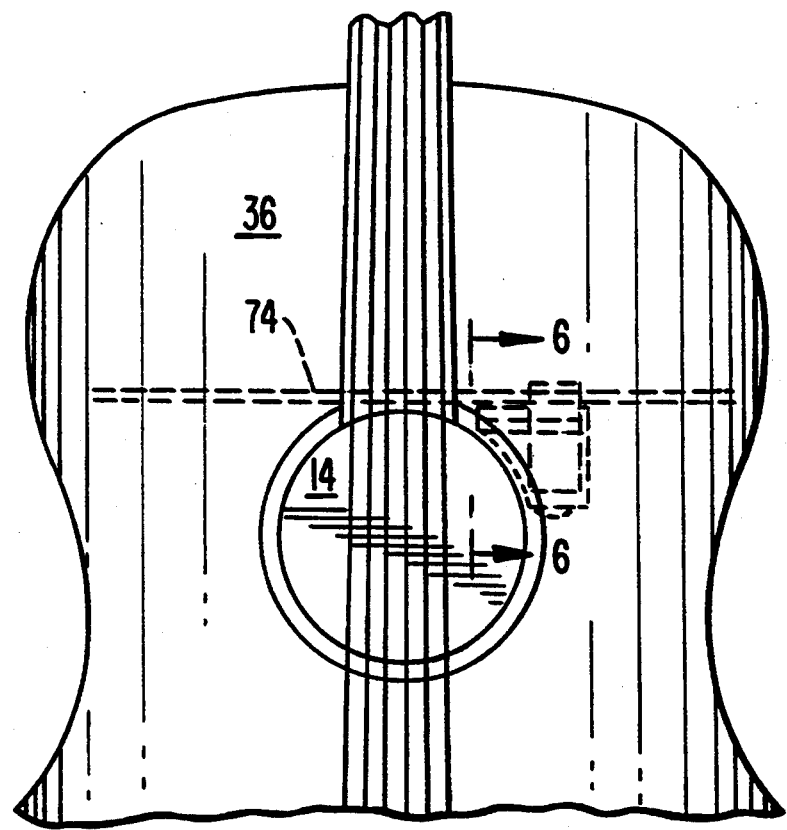
FIG. 4 is a top plan view of a portion of a guitar with an alternative embodiment of the invention mounted thereon with a mating mounting clip affixed to an internal transverse rib of the instrument.

Referring initially to FIGS. 1 through 3, in a first embodiment of the invention, the transmitter 10 unit is configured to be mountable to a guitar 12. To provide optimized pickup and response to the generated sounds, the transmitter is removably placed within the guitar body through the sound hole 14. As seen in FIG. 2, the transmitter 10 may be fashioned with a main housing portion 16 having a cylindrical extension 18 projecting from its rear face. A microphone 20 and an on/off switch 22 may be mounted upon the front face 24, which is contoured to be concentric with the sound hole 14 when mounted to the guitar. An indicator, such as an LED, as well as a microphone gain control (not shown) may also be located on the face. By the use of appropriate miniaturized components, such as surface mount technology integrated circuits, a high fidelity r.f. transmitter assembly and power source, such as mercury batteries, may be installed and mounted within the housing.

The cylindrical projection portion 18 may be terminated by a threaded cap 26 which can be removed to provide access to a battery chamber within the cylindrical projection portion 18. By the use of an appropriately chosen transmission frequency, the required antenna (not shown) may be of minimum length, and may be fabricated within the housing, especially if the housing is of a nonconductive material, such as plastic. Alternatively, it may be possible for the antenna, typically in the form of a thin wire, to project outwardly from the housing.

In a first form of mounting, a mounting clip 28 is provided. The clip includes a plate 30 having an adhesive surface 32 which allows the clip to be adhesively affixed to the inner surface 34 of the guitar top wall 36, as shown in FIG. 3. Mounted to the plate 30 is the clip portion 38, configured to frictionally engage the cylindrical projection portion 18 of the transmitter unit 10. The mounting plate is positioned on the guitar front wall such that the curved front face 24 of the transmitter will be concentric with a portion of the sound hole edge when installed upon the bracket, recessed slightly from the edge to maximize the unobtrusiveness of the transmitter.

In order to facilitate mounting of the transmitter upon the bracket, a cylindrically walled recess 40 extending inwardly into the housing is provided on the front wall 24 of the transmitter. The bore is dimensioned to accept a finger, and preferably the 5th finger, whereby the transmitter can be supported thereon. So placed, the transmitter may be manipulated through the sound hole 14 and snapped into engagement with the mounting clip 28 by engaging the cylindrical projection 18 with the clip 38. The transmitter may similarly be removed from the clip by inserting the finger into the bore and pivoting the projection 18 out of contact with the clip.

Figure 3A:
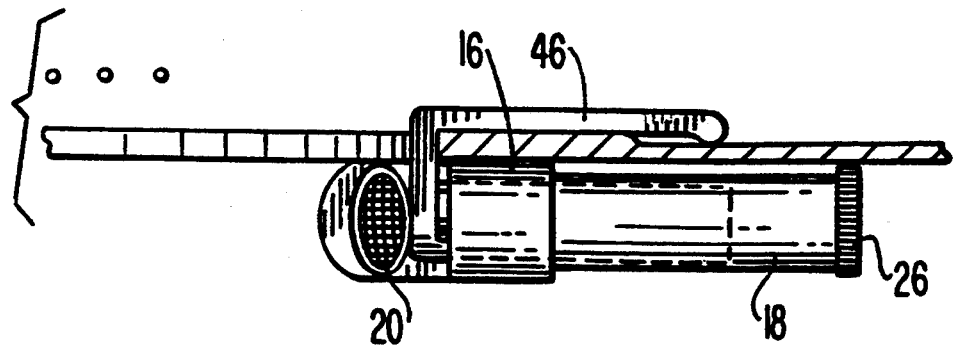
FIG. 3A is an alternative elevation view in section along line 3—3 of FIG. 1 detailing the mounting of the transmitter utilizing the alternative mounting means.

In order to provide an alternative means for mounting the transmitter, a second clip 42 may be provided, as shown in FIG. 2. This clip, which allows mounting to the sound hole without permanent affixation of a clip thereto, is generally U-shaped, the first leg of the U being a cylindrical portion 44, adapted and dimensioned to be insertable in a frictional fit within the bore 40 of the transmitter. The second leg 46 of the U is adapted to engage with the top surface of the guitar top wall 36, and may be provided with a downwardly-directed terminating lip 48. The spacing between the legs is such that, with the clip cylindrical portion 44 inserted into the bore 40, the top surface of the housing 16 and the second clip leg 46 frictionally engaging the embraced guitar top wall, as seen in FIG. 3A. The clip may preferably be formed of a resilient material, such as clear plastic, to permit flexure of the second leg 46 and to allow a snug fit to be developed between the cylindrical portion 44 and the transmitter housing bore 40. While this clip provides a small amount of exposed surface, the choice of a clear plastic for its construction makes the clip virtually invisible. Such a construction may be preferable in circumstances where the user does not wish to permanently (or semi-permanently) affix the adhesively mounted clip 28 to the guitar. Again, the transmitter is preferably positioned on the clip portion 44 such that it is slightly recessed from the sound hole edge.

Figure 5:
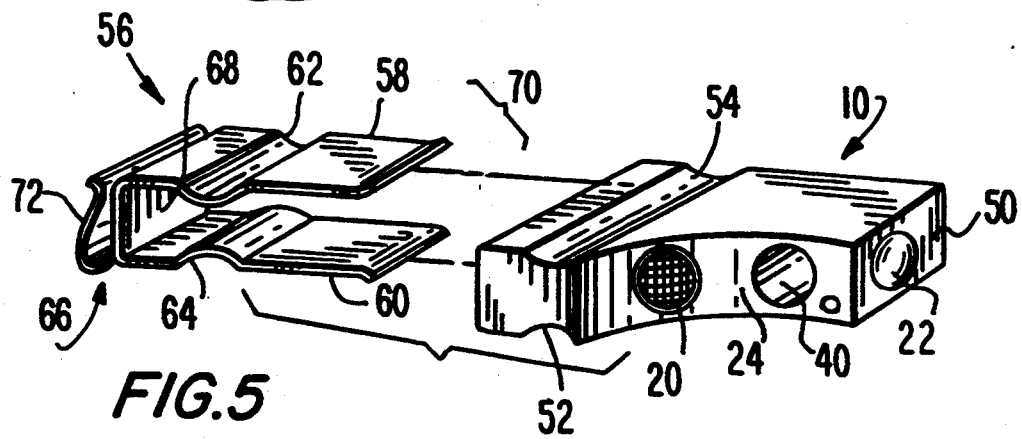
FIG. 5 is a detailed perspective view of the transmitter and mounting clip as utilized in FIG. 4.
Figure 6:
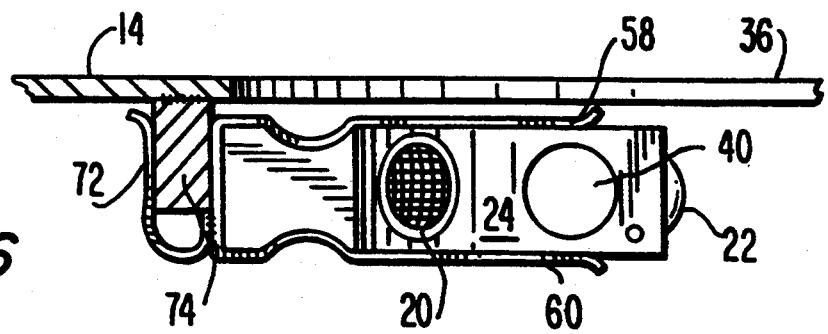
FIG. 6 is an elevation view in section taken along line 6—6 of FIG. 4 detailing the mounting of the transmitter of FIG. 4.

FIGS. 4 through 6 depict an alternative embodiment for the invention which also may be utilized in connection with a guitar or similar instrument having a round sound hole 14. As depicted therein, the transmitter 10 may be formed with parallel top and bottom surfaces, its curved front face 24 having the microphone 20 and finger bore 40. The switch 22 is provided on side wall 50. In this embodiment, the top and bottom surfaces of the housing are provided with opposed, parallel grooves 52, 54 extending between the housing's front and rear faces.

Mounting clip 56 is provided with a first U-shaped clip portion 70 having legs 58, 60 spaced to accommodate the height of the transmitter 10, and having opposed, inwardly-directed ridges 62, 64 to engage the respective grooves 52 and 54 in the top and bottom walls of the housing and thus provide a positive engagement between the clip and transmitter. To permit the mounting clip to be mounted to the guitar, a second U-shape clamp portion 66, is formed integral with the base 68 of the arm assembly, its leg 72 and base defining an upwardly-directed mouth. This clamp portion is adapted and dimensioned to engage with an internal transverse rib 74 of the guitar, best seen in FIG. 6, which is normally positioned on the lower surface of the guitar top wall 36 proximate the sound hole 14. With the clip 56 mounted to the rib 74, the transmitter, placed on the finger of the user by utilization of bore 40, may be inserted into place on the clip through the sound hole. The transmitter 10 may be similarly removed when desired, the clip 56 remaining in place.

An alternative embodiment of the invention may be utilized in connection with instruments having F holes, such as celli, double basses and the like, as opposed to the round holes of guitars. As depicted in FIGS. 7 through 9, the transmitter 10 of this embodiment is in the form of an elongated, preferably cylindrical, housing 76 in which is located the transmitter circuitry and power supply. An on/off switch and power indicator, such as an LED (not shown) may be mounted upon the housing sidewall, which may consist of two threadably interconnected portions to provide access to the housing interior for battery replacement and the like. The antenna may be positioned within the housing parallel to the length of the housing or may be in the form of an external wire as previously discussed. Affixed to a first end of the housing, through pivoting joint 78, is microphone 80. A second pivot joint 82 assembly is located at the opposite end of the housing, and supports resilient mounting puck 84. The puck 84 may be formed in two independent portions. The first portion 86 is of cylindrical construction, having a center aperture allowing it to be frictionally mounted upon the shaft 88 of the pivot joint assembly. The outer diameter of the portion is chosen to provide a tight frictional fit with the sides of the lower, wider portion 90 of the instrument's F hole 92. The second or head portion 94 is provided with a threaded central aperture adapted to mate with a threaded shank 96 extending from the end of the pivot joint assembly shaft 88. The diameter of the head is typically greater than that of the first portion, and is chosen to provide an acceptable grip for the puck while not being overly intrusive to the appearance of the instrument. The head also assists in retaining the first puck portion on the shaft. Rotation of the puck allows the orientation of the transmitter 10 to be adjusted as desired. Preferably, the transmitter is to be oriented to lie parallel to the instrument's top wall, hanging downwardly when the instrument is in the upright position, as depicted in FIG. 8.

Figure 10:
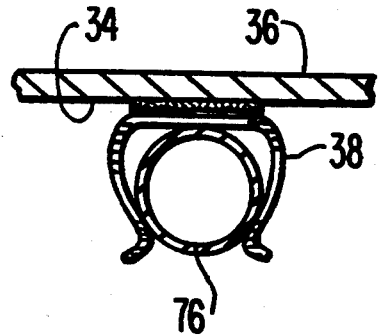
FIG. 10 is a sectional elevation view depicting the transmitter of FIG. 7 inserted into the clamp of FIG. 2.

Because of the compact design of the embodiment of FIGS. 7 through 9, it may be used in connection with other instruments, not having F holes, as well as in other locations on instruments. As shown in FIG. 10, the clip 38 as detailed in FIG. 2 may be utilized to engage the cylindrical body of the transmitter for mounting within the body of an instrument, such as a guitar, the clip being affixed to an interior surface, such as the inner surface 34 of the guitar top wall 36.

Figure 11:
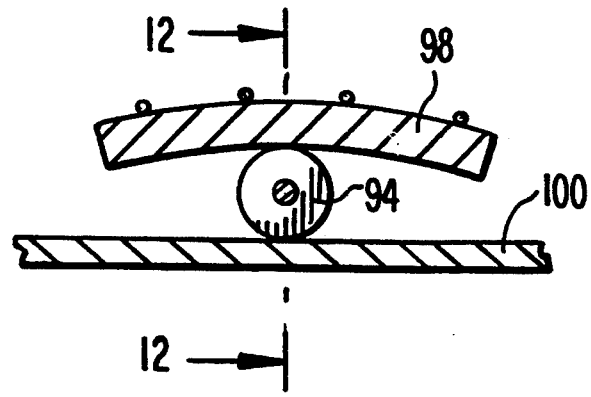
FIG. 11 is a sectional elevation view depicting the transmitter of FIG. 7 inserted under the fingerboard of an instrument.
Figure 12:
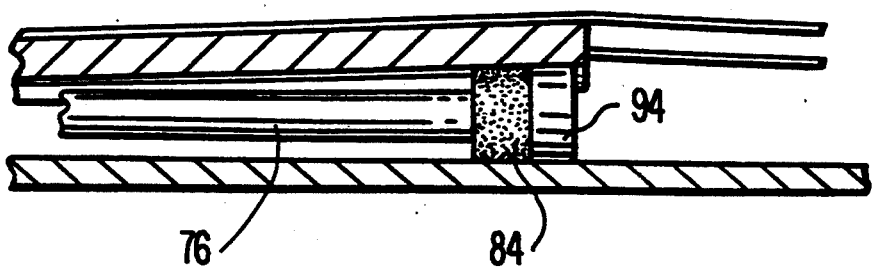
FIG. 12 is an elevation section view taken along line 12—12 of FIG. 11.

Alternatively, and as depicted in FIGS. 11 and 12, the transmitter may be inserted between the lower end of an instrument fingerboard 98 and the top of the instrument sound box 100. Certain string instruments, such as celli, mount the fingerboard to the instrument only at its upper, neck end, the lower distal end remaining free of the fingerboard, producing a gently tapering space therebetween extending along the neck of the instrument. As shown in FIG. 12, when so utilized, the puck 84 and head 94 are chosen to be of the same diameter such diameter allowing for a frictional fit between the fingerboard and sound box. So mounted, the transmitter is again virtually hidden from view, the resilient mounting of the transmitter insignificantly modifying the tonal characteristics or response of the instrument.

Figure 13:
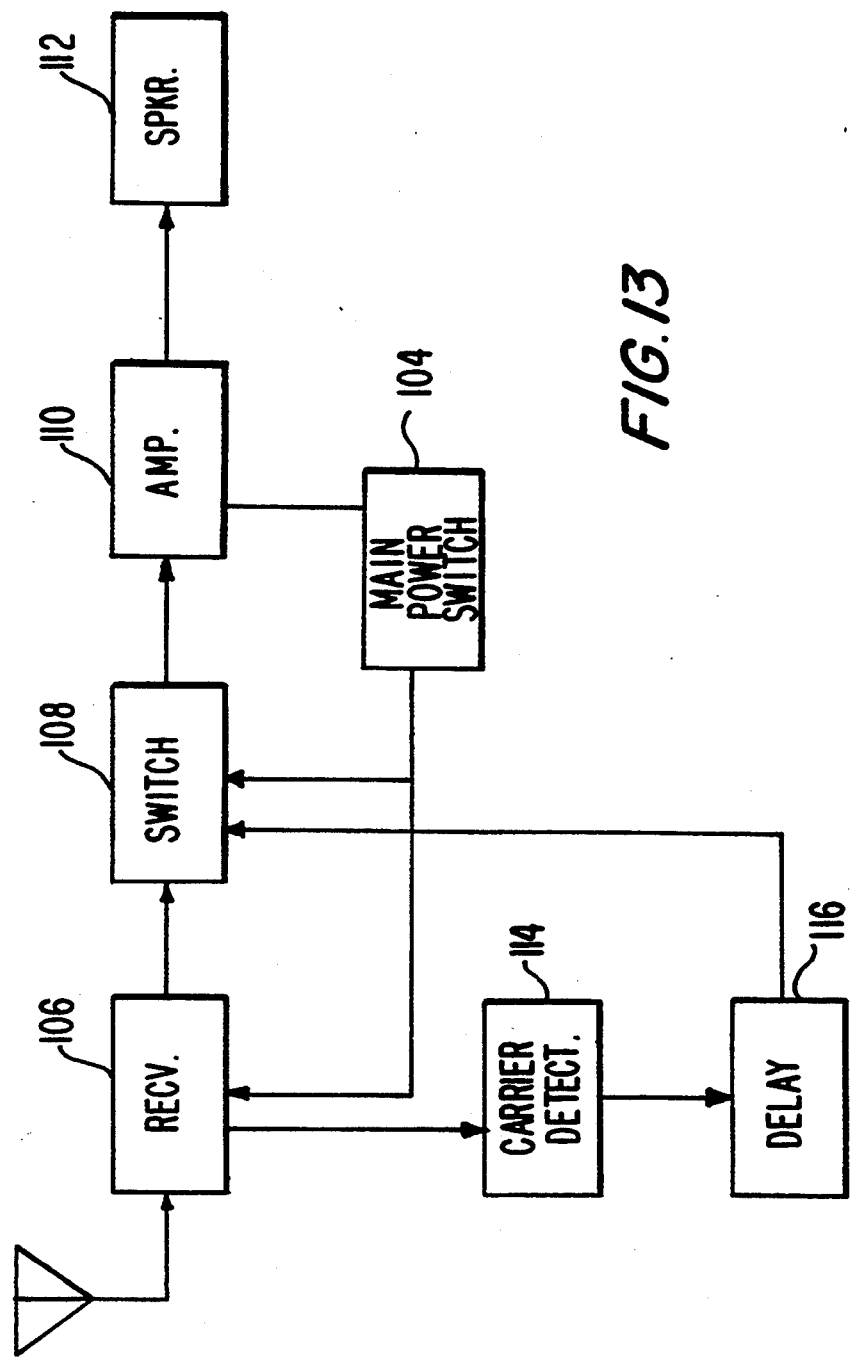
FIG. 13 is a block diagram of a preferred receiver for the transmitter.

Receivers and amplifiers as known in the art may be utilized in conjunction with the invention. Because of the superior fidelity and response of the present invention, the receiver may be preferably provided with a switching mechanism to avoid the creation, amplification and reproduction of switching transients which can normally occur as the transmitter and receiver/amplifier are energized. As shown in the FIG. 13, the receiver/amplifier is provided with a main power supply 102 which is connected to the operative stages of the receiver/amplifier through main power switch 104. The amplifier stages are isolated, however, from the receiver stage 106, by switch 108, which is typically a semiconductor switch operable by a control signal provided to an appropriate input terminal. The switch 108 is utilized to isolate the amplifier 110 from the receiver output to prevent noise spikes and the like generated during transmitter energization from being passed to the speakers.

A carrier detector 114 is coupled to the receiver 106 and is adapted to provide an output when the radio-frequency carrier of the transmitter is received. This output is passed to delay circuit 116, which in turn provides an output only after it has received an input signal for a predetermined length of time, typically 1 to 2 seconds. After such delay, the delay line output is used to activate switch 108, which then passes the audio output from receiver 106 to the following amplification circuitry. The delay is chosen to prevent the transmission, typically occurring immediately after transmitter turn-on, from being received, amplified and reproduced as pops, squeaks or other annoying sounds.

As presented herein, the transmitter of the present invention provides high clarity, distortion and interference-free reproduction of the sounds of a musical instrument when it is used, without defacement of or intrusion upon the aesthetic sensibilities of the player and audience. The microphone of the transmitter, being located within or in close proximity to the sound box, is capable of receiving the full spectrum of fundamental harmonic frequencies produced by the instrument, thus providing for full and faithful transmission of the music.

We claim:

1. A wireless sound transmission system for a sound hole-bearing hollow-body string instrument, comprising a transmitter having a housing and a microphone, r.f. transmitter and power supply operatively connected together and mounted thereto, said housing being dimensioned to be inserted within the body of the instrument through the sound hole thereof and comprising a curved front wall dimensioned to trace the curvature of a portion of said sound hole, an opposed rear wall, and a cylindrical portion extending outwardly from said rear wall capped by a threaded removable cover; and means for mounting said housing within the body of the instrument, said mounting means comprising a mounting clip having first means to mount said clip to said instrument body and second means to support said housing upon said clip, said housing having means located on said front wall for facilitating the grip of said housing by the user for insertion upon and removal from said clip, whereby said transmitter may be positioned within said body proximate the sound hole.

2. The transmission system of claim 1, wherein said cylindrical portion is adapted and dimensioned to be engaged by said clip.

3. The transmission system of claim 1, wherein said second means comprise a cylindrical walled recess in said front wall.

4. The transmission system of claim 3, wherein said means to support said housing upon said clip comprises a cylindrical element adapted to frictionally engage said recess.

5. The transmission system of claim 3, wherein said recess is dimensioned to accept a finger.

6. The transmission system of claim 5, wherein said mounting clip first means to mount said clip to said instrument body comprises a plate having an adhesively-coated surface, said mounting clip second means to support said housing upon said clip comprises a pair of arms adapted to embrace a portion of said transmitter housing.

7. The transmission system of claim 6, wherein said arms are adapted to embrace said cylindrical portion of said housing.

8. The transmission system of claim 5, wherein said housing further comprises top and bottom walls each bearing a groove therein, said means to support said housing upon said clip comprises a pair of spaced resilient legs each having a ridge adapted to mate with one of said grooves.

9. The transmission system of claim 8, said means to mount said clip to said instrument body being in the form of a hook dimensioned to embrace an internal rib of said instrument.

10. The transmission system of claim 1, wherein said housing is in the form of an elongated cylinder having first and second ends, said microphone being pivotally mounted to said first end.

11. The transmission system of claim 10, wherein said mounting means comprise a post pivotally mounted to said second end of said housing; a resilient puck and a head mountable upon said post; said puck being dimensioned for frictional mounting within an aperture of said instrument.

12. The transmission system of claim 11, wherein said post has a threaded distal portion, said head being threadable upon said post.

13. The system of claim 10 further comprising a receiver having an r.f. receiver coupled to an audio amplifier for reception of the signals transmitted by said transmitter; said receiver being coupled to said amplifier by delay means from passing a signal to said amplifier after the reception by said receiver of an r.f. carrier for a predetermined period of time.

14. A wireless sound transmission system for a string instrument having a fingerboard, an end of which is separated from a top surface of the instrument body, comprising a transmitter having a housing in the form of an elongated cylinder having first and second ends, a microphone pivotally mounted to said first end, an r.f. transmitter and power supply operatively connected to said microphone and mounted within said housing, and means mounted to said housing for mounting said housing between said fingerboard and said instrument body top surface.

15. The transmission system of claim 14, wherein said mounting means comprise a resilient puck dimensioned for functional engagement between said fingerboard and instrument body.

16. The transmission system of claim 15, wherein said puck is located at said second end of said housing.

* * * * *